US012683680B2

(12) United States Patent
Wilgosh et al.

(10) Patent No.: US 12,683,680 B2
(45) Date of Patent: Jul. 14, 2026

(54) PROACTIVELY MANAGING COMPUTED OPTICAL RESTORATION PATHS

(71) Applicant: Ciena Corporation, Hanover, MD (US)

(72) Inventors: Michael Wilgosh, Nepean (CA); Christiane Louise Campbell, Ottawa (CA); Hien Nguyen, Bowie, MD (US); Blair Moxon, Ottawa (CA)

(73) Assignee: Ciena Corporation, Hanover, MD (US)

( * ) Notice: Subject to any disclaimer, the term of this patent is extended or adjusted under 35 U.S.C. 154(b) by 286 days.

(21) Appl. No.: 18/425,781

(22) Filed: Jan. 29, 2024

(65) Prior Publication Data

US 2025/0247147 A1      Jul. 31, 2025

(51) Int. Cl.
*H04B 10/03*              (2013.01)

(52) U.S. Cl.
CPC .................................... *H04B 10/03* (2013.01)

(58) Field of Classification Search
CPC ..... H04B 10/03; H04L 41/0663; H04L 41/40; H04L 41/5009; H04L 41/5025; H04Q 11/0062; H04Q 2011/0081
See application file for complete search history.

(56) References Cited

U.S. PATENT DOCUMENTS

| | | | |
|---|---|---|---|
| 6,941,359 | B1 | 9/2005 | Beaudoin et al. |
| 7,107,496 | B1 | 9/2006 | D'Ippolito et al. |
| 7,149,975 | B1 | 12/2006 | Johnson et al. |
| 7,346,277 | B2 * | 3/2008 | Atkinson ............ H04J 14/0241 |
| | | | 398/1 |

| | | | |
|---|---|---|---|
| 9,357,278 | B2 | 5/2016 | Swinkels et al. |
| 10,587,339 | B1 * | 3/2020 | Al Sayeed ............. H04B 10/70 |
| 11,101,884 | B1 | 8/2021 | Campbell et al. |
| 11,463,325 | B2 | 10/2022 | D'Ippolito et al. |
| 11,496,817 | B2 | 11/2022 | MacKay et al. |
| 11,507,262 | B2 | 11/2022 | Campbell et al. |
| 2010/0080119 | A1 * | 4/2010 | Ansorge ............. H04L 41/0677 |
| | | | 370/225 |
| 2010/0172236 | A1 | 7/2010 | Madrahalli et al. |

(Continued)

FOREIGN PATENT DOCUMENTS

| | | |
|---|---|---|
| CA | 2287844 A1 | 5/2001 |
| EP | 0928117 A3 | 4/2000 |

OTHER PUBLICATIONS

Apr. 4, 2025, International Search Report and Written Opinion for International Patent Application No. PCT/US2025/010434.

*Primary Examiner* — Mohammed Abdelraheem
(74) *Attorney, Agent, or Firm* — Baratta Law PLLC; Lawrence A. Baratta, Jr.

(57) ABSTRACT

Systems and methods include continuously tracking health of services in an optical network, monitoring how many restoration paths remain accessible to an on-box control plane, and quality of any remaining restoration paths; managing restoration paths installed on the nodes to one or more of remove unavailable restoration paths and add new available restoration paths for any of the services in the optical network; responsive to detecting one or more at-risk services, for the one or more at-risk services, performing computation of new viable restoration paths and a multi-stage policy-based ranking of the new restoration paths for the service; and for the one or more at risk services, pushing the ranked new viable restoration paths to the on-box control plane based on thresholds.

20 Claims, 6 Drawing Sheets

(56) References Cited

U.S. PATENT DOCUMENTS

| | | | | |
|---|---|---|---|---|
| 2012/0134263 | A1* | 5/2012 | Xiang | H04Q 3/0075 |
| | | | | 370/228 |
| 2016/0337168 | A1* | 11/2016 | Rebella | H04L 47/24 |
| 2017/0317953 | A1* | 11/2017 | Sareen | H04L 49/25 |
| 2018/0212866 | A1* | 7/2018 | Kumar | H04L 41/40 |
| 2022/0007093 | A1* | 1/2022 | MacKay | H04B 10/038 |
| 2022/0070050 | A1 | 3/2022 | D'Ippolito et al. | |
| 2022/0376997 | A1 | 11/2022 | Sinclair et al. | |
| 2022/0385357 | A1 | 12/2022 | Chander et al. | |
| 2023/0125468 | A1 | 4/2023 | Campbell et al. | |
| 2023/0224224 | A1 | 7/2023 | Stoll et al. | |

* cited by examiner

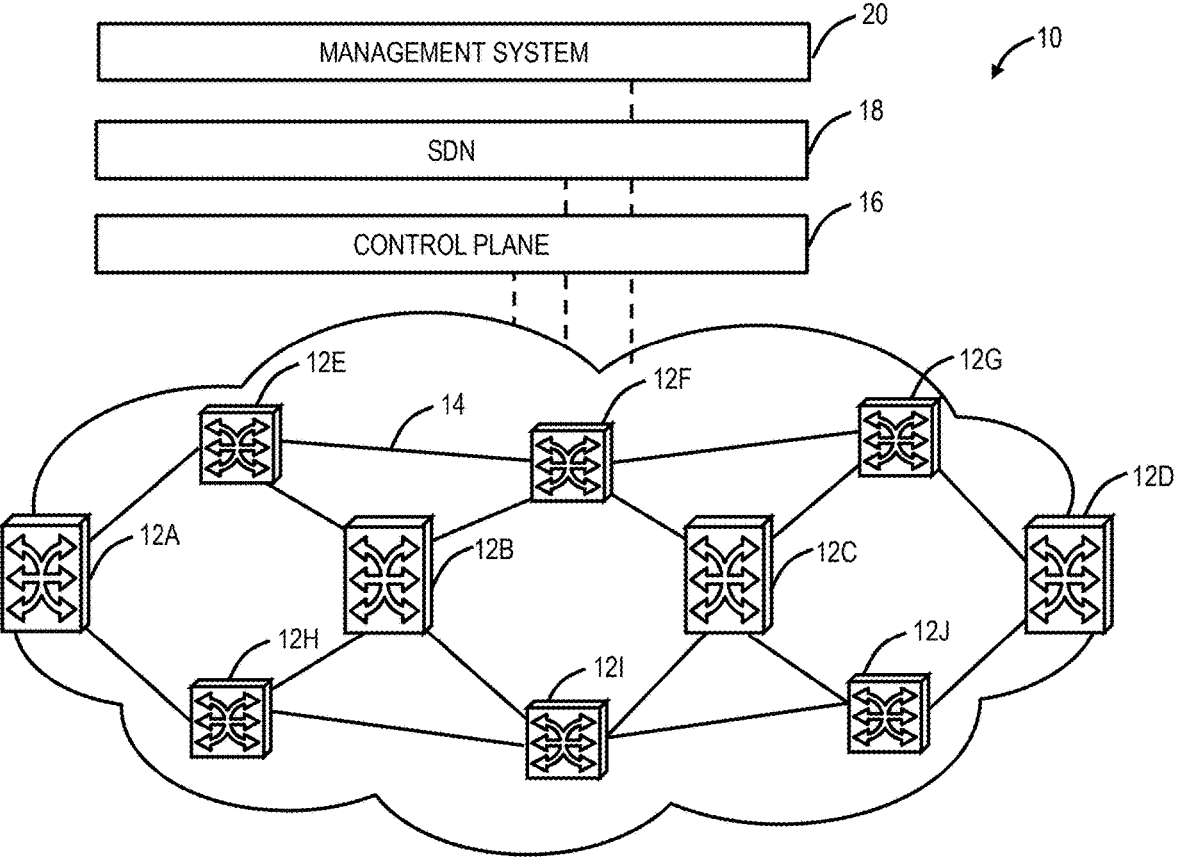
_FIG. 1_

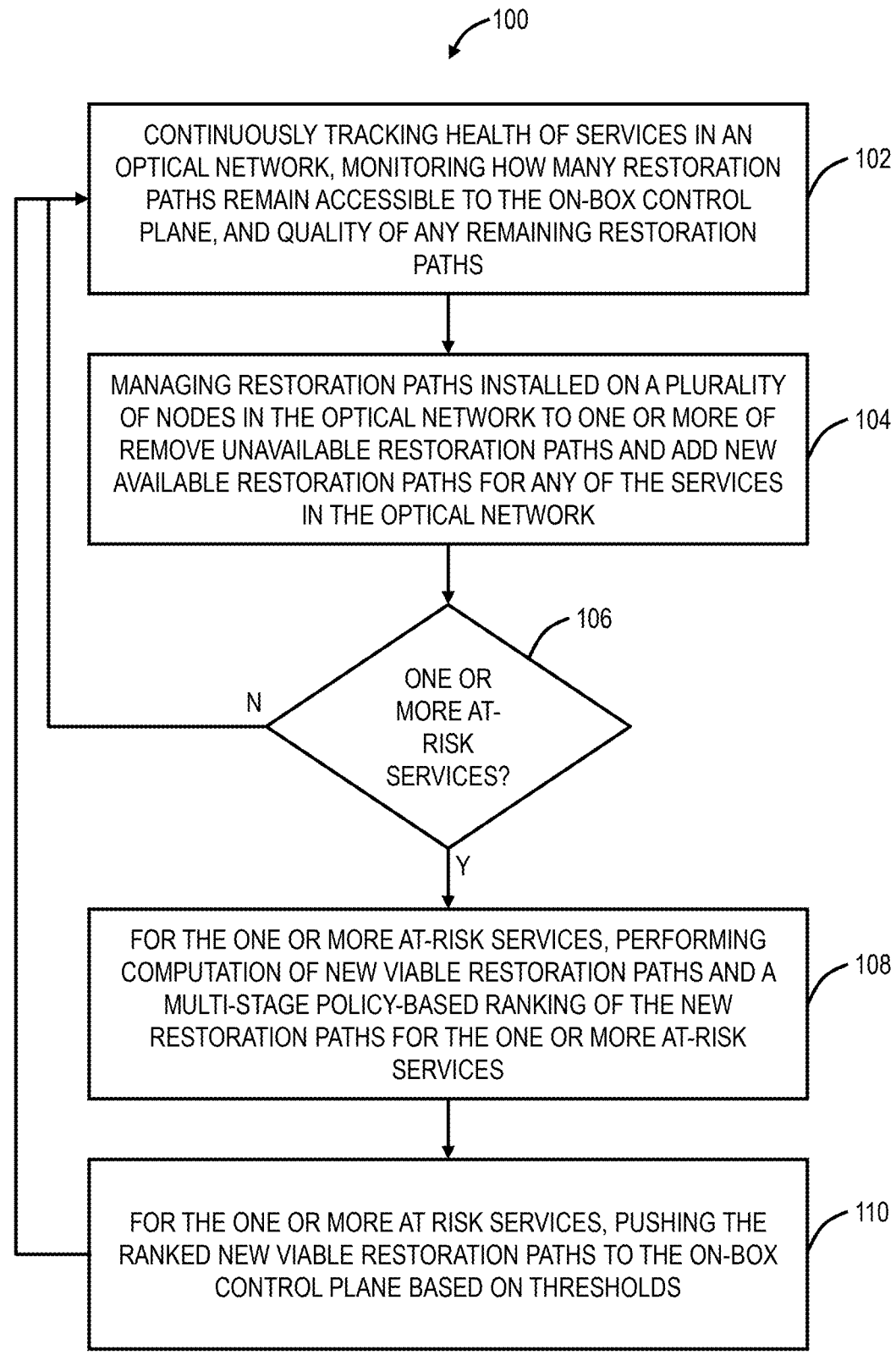
_FIG. 4_

150

| | SNCs | | Links down | NEs not connected |
|---|---|---|---|---|
| Photonic restoration assurance 10,124 SNCs | | | | |
| Warning threshold crossed | 205 (2.0%) | | 25 | 0 |
| Refresh threshold crossed | 11 (0.2%) | | 5 | 0 |
| Failed to refresh | (0.1%) | | 2 | 12 |

152

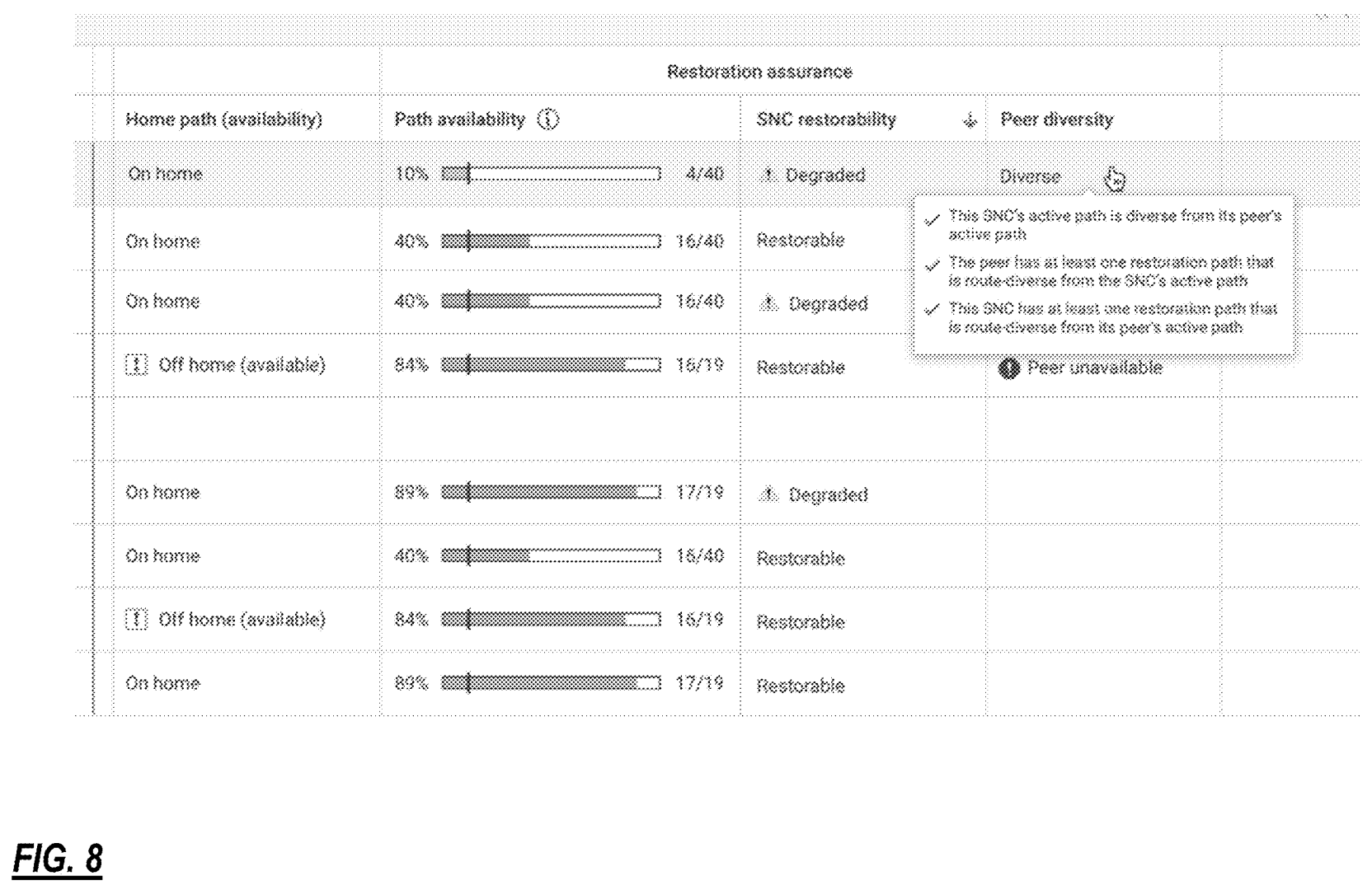

Restoration assurance

| Home path (availability) | Path availability | | | SNC restorability | Peer diversity |
|---|---|---|---|---|---|
| On home | 10% | | 4/40 | ↑ Degraded | Diverse |
| On home | 40% | | 16/40 | Restorable | |
| On home | 40% | | 16/40 | ↑ Degraded | |
| ☒ Off home (available) | 84% | | 16/19 | Restorable | |
| On home | 89% | | 17/19 | ↑ Degraded | |
| On home | 40% | | 16/40 | Restorable | |
| ☒ Off home (available) | 84% | | 16/19 | Restorable | Peer unavailable |
| On home | 89% | | 17/19 | Restorable | |

Tooltip:
✓ This SNC's active path is diverse from its peer's active path
> The peer has at least one restoration path that is route-diverse from the SNC's active path
✓ This SNC has at least one restoration path that is route-diverse from its peer's active path

*FIG. 8*

PROACTIVELY MANAGING COMPUTED OPTICAL RESTORATION PATHS

FIELD OF THE DISCLOSURE

The present disclosure relates generally to networking and computing. More particularly, the present disclosure relates to systems and methods for proactively managing computed optical restoration paths.

BACKGROUND OF THE DISCLOSURE

Communication networks are built on various layers, such as defined in the Open Systems Interconnection (OSI) model. Of note, Layer 0 (L0) is added to the OSI model to represent the optical, photonic, Dense Wavelength Division Multiplexing (DWDM), etc. layer. As used herein, the term optical is meant to cover all different names for this layer. As L0 is the core layer of the network upon which all other services operate, faults (e.g., fiber cuts, equipment failure, etc.) need to be addressed efficiently. Existing approaches rely on various techniques include Layer 0 Control Plane (L0CP) restoration where protection or restoration paths are computed and stored "on box" meaning at a network element. When there is a fault, the network element managing the L0 service can quickly switch to one of the computed on box paths. This approach has worked well at Layer 1 (L1), Time Division Multiplexing (TDM) such as with Optical Transport Network (OTN) services. However, L0 adds some complexity in that a computed path may or may not be viable in the optical domain. That is, the L0CP does not know if a dynamically computed path is viable until it tries it, i.e., sets it up end-to-end, and waits to see if the modem can acquire a signal. This added viability complexity is not an issue at higher layers as these operate all digitally. Accordingly, the use of dynamic computed paths at L0 is a "shot in the dark." Practical implementations have shown these issues can result in minutes or even in extreme cases of hours of outage times where the L0CP tries non-viable path after path.

BRIEF SUMMARY OF THE DISCLOSURE

The present disclosure relates to systems and methods for proactively managing computed optical restoration paths. In particular, the present disclosure includes continuously monitoring services at L0 and dynamically computing alternative paths that meet a minimum number of service constraints, are checked for viability, and ranked as per policy for these "at risk" services. These computed paths are maintained in real-time and then pushed into the network so that the on-box restoration engine includes a full set of validated paths to use before it exhausts any current set of paths. For example, replacement paths can be pushed in real-time as each path become unavailable, or to mitigate performance requirements, paths could be pushed based on triggers so that only services/Subnetwork Connections (SNCs) that are nearing exhaustion have their unavailable paths updated. The objective is to avoid service failures for the maximum uptime achievable in the customers network for that service. In various embodiments, the present disclosure can be realized in a multi-vendor capable manner, e.g., an orchestrator, Software Defined Networking (SDN) controller or application, management system, etc.

In large networks (e.g., with more than 500 nodes) with high route failure rates (one raise or clear event every 10-20 minutes) or highly meshed networks (e.g., metro), an on-box control plane with a static set of routes cannot achieve 99.999% service availability due to the very high number of failure combinations and resulting very high number of static paths that would have to be computed and stored per service. Also, during the growth stages network topology changes almost daily. This makes the computed static paths age quickly to point that the restoration paths are out of date within weeks of being pushed into the network. To that end, the approach described herein addresses these problems.

In various embodiments, the present disclosure includes a computer-implemented method having steps, a processing device, system, or apparatus configured to implement the steps, and as a non-transitory computer-readable medium with instructions that, when executed, cause one or more processors to perform the steps. The steps include continuously tracking health of services in an optical network, monitoring how many restoration paths remain accessible to an on-box control plane, and quality of any remaining restoration paths; managing restoration paths installed on a plurality of nodes in the optical network to one or more of remove unavailable restoration paths and add new available restoration paths for any of the services in the optical network; responsive to detecting one or more at-risk services, for the one or more at-risk services, performing computation of new viable restoration paths and a multi-stage policy-based ranking of the new restoration paths for the one or more at-risk services; and, for the one or more at risk services, pushing the ranked new viable restoration paths to the on-box control plane based on thresholds.

The on-box control plane can be implemented via the plurality of nodes, and the services are managed by an associated head-end node of the plurality of nodes, wherein the associated head-end node includes the restoration paths installed thereon for a given service. The steps can be performed by an off-box processing system communicatively coupled to the optical network and the on-box control plane. The new viable restoration paths can be determined first using End-of-Life (EOL) viability, second using instantaneous viability, and finally using downshifted capacity. The steps can further include, for an at-risk service of the one or more at-risk services, responsive to detecting a number of corresponding restoration paths is below a threshold, determining an emergency restoration path for the at-risk service and pushing the emergency restoration path to a corresponding head-end node for the at-risk service.

The multi-stage policy-based ranking can include processing the services based on priority, relaxing constraints on the processing for lower priority services, and determining the new restoration paths considering up-time of links and over-subscription of the links. The computation of the new viable restoration paths can include considering for use any equipment in the optical network that is available due to one of faults and installed for future use. The steps can further include, subsequent to the pushing the ranked new viable restoration paths for a service of the one or more at-risk services, monitoring the optical network for any opportunity to return to the restoration paths for the service prior to the pushing. The steps can further include displaying a user interface visualizing the one or more at-risk services including any of the at-risk services due to lack of communication to the on-box control plane.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 1 is a network diagram of an example multi-layer network with various interconnected nodes.

FIG. 4 is a flowchart of a process for proactively managing computed optical restoration path.

FIG. 8 is a screenshot of a UI illustrating a restoration assurance and diversity status health monitor.

DETAILED DESCRIPTION OF THE DISCLOSURE

Figure 2:
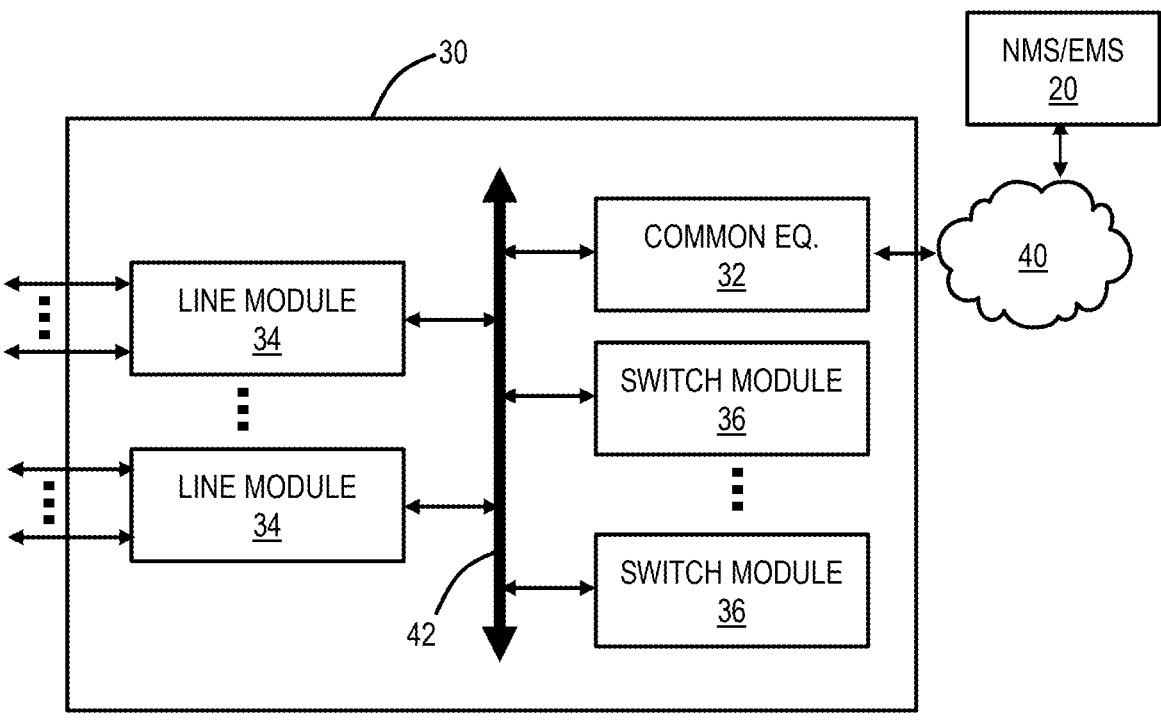
FIG. 2 is a block diagram of an example network element 30 for with the systems and methods described herein.

Again, the present disclosure relates to systems and methods for proactively managing computed optical restoration paths. Conventional approaches to the L0CP restoration problem have focused exclusively on L0 rather than driving changes based on impacts at higher layers. For example, the conventional approaches focus on increasing the number of paths stored on box (i.e., on box means at the node or network element) and/or using centralized software (i.e., a management system, SDN controller, planning system, etc.) to push computed paths into the network (for storage on box).

The present disclosure provides an approach to continuously monitor and dynamically update "at risk" services in terms of their current level of resiliency in a mesh network by proactively monitoring and updating their restoration paths (e.g., a Designated Transit List set (DTLSET)). The goals include maintaining restoration availability and the quality of restoration paths, in addition to progressively relaxing those constraints to avoid total service failure, i.e., loosening requirements as capacity increases. Again, conventional approaches focus on monitoring degradation of the service path itself (based on alarms, Performance Monitoring (PM) data, Machine Learning (ML), etc.) to predict when failure of that path will occur.

The present disclosure includes dynamically updating failed Designated Transit Lists (DTLs) within the existing SNC's DTLSET to avoid SNC failure due to a lack of available and viable paths. The present disclosure uses the term DTL, SNC, and DTLSET for illustration purposes and those skilled in the art will recognize other terms for similar functions are contemplated herewith. A DTL is generally a list that includes a L0 path through an optical network, a DTLSET is a group or set of DTLs, and an SNC is a L0 service, i.e., wavelength, that is managed and controlled by the L0CP. An SNC can have one or more DTLs in its DTLSET to choose from at the point of restoration. The present disclosure focuses on managing the DTLs in the DTLSET for SNCs in the L0CP. Of note, the terms DTL and path can be used interchangeably and one skilled in the art would recognize a path is an A-Z (source to destination) in the optical network for a wavelength (or group of spectrum) and the DTL is a list of the nodes in the network for the path. Also, the terms SNC and services can be interchangeably and one skilled in the art would recognize they both refer to a wavelength or spectrum being managed in the optical network by a L0CP.

The present disclosure manages DTLSETs by continuing to find high quality restoration paths that meet all service constraints until all paths in the network are exhausted. Any replacement paths can be computed using instantaneous or end-of-life (EOL) viability where EOL viability will have more margin than instantaneous viability. Specifically, instantaneous viability looks at can a L0 service be supported right now, without considering full-fill or aging of optical components whereas the EOL viability adds extra margin to cover worst-case assumptions. With managing these types of viability decisions, it is possible to support progressive service constraint relaxation. The present disclosure can distribute restoration paths with contention equitably among the services requiring re-fresh to avoid unbalanced re-fresh of services and selecting the worse acceptable paths before more desirable paths.

The present disclosure introduces the concept of service constraint repair as network conditions allow. The present disclosure can use a multi-layer analysis to avoid additional switching at the higher layers by re-purposing optical modems to temporarily provide additional bandwidth to existing higher layer paths. Also, the present disclosure includes Fault Management linkage where the system is able to suggest a trouble repair order that maximizes service availability.

The present disclosure provides the ability to optimize restoration paths on network failure restoration that are not possible solely via an on-box control plane. Those skilled in the art will appreciate the terms optimize, optimization, optimal, etc. are used in comparison with conventional approaches to L0CPs where management is distributed and performed on-box. Particularly, these terms do not necessarily mean the absolute best solution in every given circumstance. Rather, they are meant to denote improvement from the baseline, i.e., conventional approaches to L0CPs. The present disclosure enables efficient provisioning of the optimized restoration paths on the network element, to ensure high availability (e.g., 5 9's service availability), especially in optical networks with high failure rates. An aspect of the present disclosure is an off-box path computation component used with the distributed, on-box L0CP. As described herein, on-box refers to functionality performed at a network element whereas off-box refers to functionality performed externally at a processing system (e.g., Network Management System (NMS), SDN controller or application, orchestrator, planning system, a Path Computation Engine (PCE), etc.). The off-box, path computation can include validation of optical viability for a large number of potential restoration paths with complex service constraints and optimal usage of optical regenerators, where required, in an optical network.

Optical viability of a path is semantically different from an Internet Protocol (IP) viable path due to the difference between analog (optical) components and digital components. The present disclosure uses two different types of optical viability, instantaneous (which can be referred to also as Begin-of-Life (BOL)) viability which is computed from network data and excludes repair and other EOL margin reservations (for service restoration paths) and EOL viability which includes these factors (for service home path). On the other hand, off-box IP control planes deal with congestion control by computing new viable paths that minimize a cost function that considers the resulting utilizations on links to ensure service QoS parameters (bandwidth and latency) are within limits.

Example Network

FIG. 1 is a network diagram of an example multi-layer network 10 with various interconnected nodes 12 (illustrated as nodes 12A-12J). The nodes 12 are interconnected by a plurality of links 14, which can be either physical (in Layer 0, optical fiber) or logical (such as at higher layers). The nodes 12 communicate with one another over the links 14 through Layer 0 (L0) such as optical wavelengths (DWDM), Layer 1 (L1) such as OTN, Layer 2 (L2) such as Ethernet, Multiprotocol Label Switching (MPLS), etc., and/or Layer 3 (L3) protocols. The nodes 12 can be network elements which include a plurality of ingress and egress ports forming the links 14. An example node implementation is illustrated in FIG. 2. The network 10 can include various services between the nodes 12. Each service can be at any of the L0, L1, L2, and/or L3 protocols, such as a wavelength, an SNC, a Label Switched Path (LSP), etc. A service is an end-to-end path or an end-to-end signaled path, in terms of management and control. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. The control plane 16 can be different at the different layers. That is, the present disclosure focuses on a L0CP for the control plane 16. Those skilled in the art will recognize there can be different control planes managing services at L1, L2, L3, etc. and combinations thereof. That is, the present disclosure utilizes L0CP and the control plane 16 interchangeably.

The control plane 16 provide an automatic allocation of network resources in an end-to-end manner in the network 10. Example control planes include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); Open Shortest Path First (OSPF); Intermediate System-Intermediate System (IS-IS); and the like. Of course, the present disclosure contemplates any type of control plane for controlling network elements and establishing connections among nodes. That is, those of ordinary skill in the art will recognize the network 10 and the control plane 16 can utilize any type of control plane for controlling the nodes 12 and establishing, maintaining, and restoring calls or services between the nodes 12.

Control planes are configured to establish end-to-end signaled connections such as SNCs in ASON or OSRP and LSPs in GMPLS and MPLS. Note, as described herein, SNCs and LSPs can generally be referred to as services in the control plane 10, to avoid the implementation specific terms of SNCs, LSPs, etc. Control planes use the available paths to route the services and program the underlying hardware accordingly. Again, the present disclosure utilizes the term SNC, DTL, and DTLSET, but those skilled in the art will recognize the approach described herein is not limited to ASON or OSRP.

Restoration (also referred to as protection) is a key feature in the network 10 where a backup (protection) path takes over for an active (working) path of a service when there is a failure in the active path. Restoration can include dedicated, reserved protection paths (e.g., 1+1) for working paths which provide extremely fast restoration (sub-50 ms) at the expense of efficient bandwidth usage, i.e., the protection paths are active and unused in the network. At the other end of restoration time is mesh restoration which includes computing paths at the time of failures and can lead to several seconds for restoration. Of course, unprotected services can be provisioned without restoration capabilities. Various techniques are used in between these extremes (dedicated protection and mesh restoration with path computation upon failures) to balance the efficient use of bandwidth versus restoration time. Of course, in terms of restoration, the goal is to minimize restoration time while concurrently minimizing the inefficient use of bandwidth. It would be advantageous to support dedicated protection paths which provide the advantage of quick restoration time, without the disadvantage of inefficient bandwidth usage.

One approach in L0 Control Planes (L0CP) is to maintain computed protection paths so that when there is a given failure, the corresponding computed protection paths can be quickly used to determine restoration. The computed protection paths can be managed in a protection path list. As described herein, a protection path list can include a DTL in ASON, PNNI, and OSRP, an Explicit Route Object (ERO) in Resource Reservation Protocol-Traffic Engineering (RSVP-TE) (G.7713.2), and the like. That is, the present disclosure contemplates any implementation of a computed protection path list, the term protection path list is meant to cover any implementation (e.g., DTL, ERO, etc.), and the present disclosure may use DTL in the description for illustration purposes; those skilled in the art will recognize DTL is one example of a protection path list and is meant to cover any type.

In addition to control planes which are distributed, a centralized technique of control exists with SDN which utilizes a centralized controller, e.g., an SDN controller 18 can also be communicatively coupled to the network 10 through one or more of the nodes 12. SDN is a framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. In some embodiments, the SDN controller 18 differs from a management system 20 in that it controls the forwarding behavior of the nodes 12 only, and performs control in real time or near real time, reacting to changes in services requested, network traffic analysis and network changes such as failure and degradation. Also, the SDN controller 18 provides a northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 may not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof.

Also, the network 10 can include the management system 20 which can be a Network Management System (NMS), an Element Management System (EMS), network planning system, orchestrator, application, etc. The control plane 16 conventionally is a distributed system operating across al of the nodes 12. Typically, for each service (i.e., SNC), a source node 12 is configured to manage the service, namely compute the path, signal other nodes 12 for establishing the path, and perform restoration for the service upon faults. The computed protection paths, e.g., via a DTLSET, can be used to quickly select and implement a new path when restoration is required. The present disclosure includes management of such paths between the source nodes 12 and the management system 20. Again, the term on-box as used herein refers to functionality at the nodes 12 whereas off-box refers to functionality outside of the nodes, such as at the management system 20 or the like.

Example Network Element

FIG. 2 is a block diagram of an example network element 30 for use with the systems and methods described herein. That is, the network element 30 is one example implementation of the node 12 in the network 10. In an embodiment, the network element 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. In the context of the present disclosure, the network element 30 can be any optical system with ingress and egress of optical channels and can optionally include digital system components with ingress and egress digital signals and switching of channels, timeslots, tributary units, etc.

In an embodiment, the network element 30 includes common equipment 32, one or more line modules 34, and one or more switch modules 36. The common equipment 32 can include power; a control module; Operations, Administration, Maintenance, and Provisioning (OAM&P) access; user interface ports; and the like. The common equipment 32 can connect to a management system 38 through a data communication network 40 (as well as a Path Computation Element (PCE), SDN controller 18, OpenFlow controller, etc.). The management system 20 can include a Network Management System (NMS), Element Management System (EMS), or the like. Additionally, the common equipment 32 can include a control plane processor, such as a controller 50 illustrated in FIG. 3 configured to operate the control plane 16 as described herein. The network element 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the network element 30. In an embodiment, the line modules 34 can form ingress and egress switches with the switch modules 36 as center stage switches for a three-stage switch, e.g., a three-stage Clos switch. Other configurations and/or architectures are also contemplated. The line modules 34 can include optical transceivers, modems, transponders, etc., including pluggable optical modules and the like.

Further, the line modules 34 can include a plurality of optical connections per module and each module may include a flexible rate support for any type of connection. The line modules 34 can include wavelength division multiplexing interfaces, short reach interfaces, and the like, and can connect to other line modules 34 on remote network elements, end clients, edge routers, and the like, e.g., forming connections on the links in the network 10. From a logical perspective, the line modules 34 provide ingress and egress ports to the network element 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity (Layer 1 switching); packet switching; and the like. Specifically, the switch modules 36 can include Time Division Multiplexed (TDM) (i.e., circuit switching) and/or packet switching engines. The switch modules 36 can include redundancy as well, such as 1:1, 1:N, etc.

Figure 3:
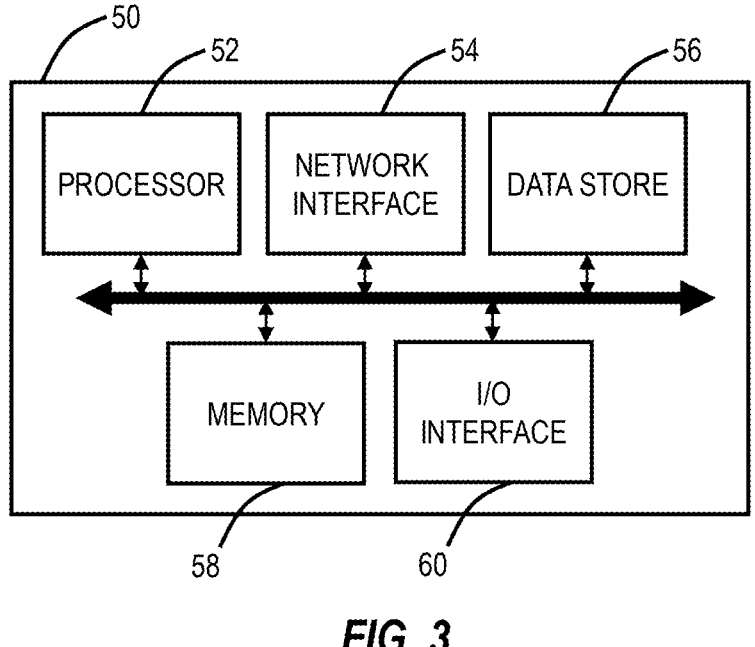
FIG. 3 is a block diagram of a controller configured to provide control plane processing and/or Operations, Administration, Maintenance, and Provisioning (OAM&P) for the network element of FIG. 2, and/or to implement an SDN controller, a management system, or any other off-box component.

Those of ordinary skill in the art will recognize the network element 30 can include other components which are omitted for illustration purposes, and that the systems and methods described herein are contemplated for use with a plurality of different network elements with the network element 30 presented as an example type of network element. For example, in another embodiment, the network element 30 may not include the switch modules 36, but rather have the corresponding functionality in the line modules 34 (or some equivalent) in a distributed fashion. In a further embodiment, the network element 30 may not include modules, but rather be an integrated device. That is, the modules 32, 34, 36 can be viewed as functional components that may be realized in any manner. For network element 30, other architectures providing ingress, egress, and switching are also contemplated for the systems and methods described herein. In general, the systems and methods described herein contemplate use with any network element providing wavelength services using the control plane 16. Those skilled in the art will appreciate the network element 30 is merely presented for illustration purposes and the systems and methods described herein contemplate use with various other network elements.
Example Controller FIG. 3 is a block diagram of a controller 50 configured to provide control plane processing and/or Operations, Administration, Maintenance, and Provisioning (OAM&P) for the network element 30, and/or to implement the SDN controller 18, the management system 20, or any other off-box component. That is, the controller 50 can be part of the common equipment, such as common equipment 32 in the network element 30, or a stand-alone device communicatively coupled to the network element 30 via the DCN 40. In a stand-alone configuration, the controller 50 can be the SDN controller 18, an NMS, a PCE, etc. The controller 50 can include at least one processor 52 which is a hardware device for executing software instructions such as operating the control plane 16. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., Random Access Memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., Random Access Memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with protocol signals.

The controller 50 is configured to communicate with other controllers 50 in the network 10 to operate the control plane 16 via control plane signaling. This communication may be either in-band or out-of-band. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e., traversing the links through the nodes from the originating node to the destination node based on a plurality of constraints such as administrative weights on the links, bandwidth availability on the links, etc.
Problem Statement There are two significant problems in achieving 5 9's service availability in large L0 control plane networks with high link failure rates, namely:

(1) In large mesh networks with regenerator ("regen") pools, the number of paths between two points in the network become unmanageably large. It is impractical at this time to store all routes on the node 12 and so an imperfect subset of routes must be selected resulting in non-optimal fault coverage. A regen pool means a location where a service can be regenerated, i.e., optical-electrical-optical (OEO) conversion, thereby extending the reach.

(2) On-box control planes do not support computing viability nor complex service constraint management. This limits the usefulness of dynamic route calculation by the on-box control plane.
Solution Overview As such, the present disclosure includes feedback-based closed loop automation to dynamically re-supply the on-box control plane 16 with quality paths as needed. The overall solution leverages the on-box restoration performance with the off-box intelligence to achieve a network that can self-heal continuously until all resources are exhausted. The approach can be described in six components:

1. Service monitoring;
    2. Computation of viable paths;
    3. Multi-stage policy-based ranking of paths;
    4. Multi-layer analysis;
    5. Threshold based DTLSET path refresh; and
    6. Threshold based DTLSET reversion to original (optimal) paths.

FIG. 4 is a flowchart of a process 100 for proactively managing computed optical restoration paths. The present disclosure includes an off-box system, which may be referred to herein as simply a system, configured to perform this closed-loop automation. The system can implement the process 100 which may be realized as a method having steps, via an apparatus including a processor configured to implement the steps, and via a non-transitory computer-readable medium with instructions that, when executed, cause one or more processors to implement the steps. The process 100 includes feedback-based closed loop automation to dynamically re-supply the on-box control plane 16 with quality paths as needed. The process 100 leverages the on-box restoration performance with the off-box intelligence to achieve a network that can self-heal continuously until all resources are exhausted. The process 100 includes the six components described above in the steps, specifically some steps include multiple components, and those skilled in the art will appreciate the steps can be used together, in different combinations, as well as omitted some of the steps.

The process 100 includes continuously tracking health of services in an optical network, monitoring how many restoration paths remain accessible to the on-box control plane 16, and quality of any remaining restoration paths (step 102). Specifically, this tracking and monitoring step 102 includes reviewing existing restoration paths that are on-box, i.e., installed at each of the nodes 12, as well as reviewing possible different restoration paths that are not installed, but reviewed for various factors such as degrees of diversity, compliancy to service constraints, etc. A key aspect of this reviewing and monitoring is optical viability as described herein, i.e., a non-viable restoration path needs to be removed from the node 12.

The process 100 includes managing restoration paths installed on a plurality of nodes 12 in the optical network to one or more of remove unavailable restoration paths and add new available restoration paths for any of the services in the optical network (step 104). This managing step 104 can be performed instantaneously to update unavailable paths, i.e., in real-time as the process 100 operates, or configured to only update when necessary, e.g., at given intervals, when there is a threshold number of paths, based on network events, etc. For example, the managing step 104 can be configured to update restoration routes for services at pre-determined intervals in normal operation, and to detect at-risk services and trigger the following step.

The process 100 includes detecting one or more at-risk services in the optical network (step 106), and for the one or more at-risk services, performing computation of new viable restoration paths and a multi-stage policy-based ranking of the new restoration paths for the one or more at-risk services (step 108). Optionally, the process 100 can also perform a multi-layer analysis as well in combination with the computation of new viable restoration paths and the multi-stage policy-based ranking, The process 100 includes, for the one or more at-risk services, pushing the ranked new viable restoration paths to the on-box control plane 16 based on thresholds (step 110). The process 100 can be tuned through two user customizable thresholds: "Warning" and "Replace". The "Warning" threshold is used to indicate an at-risk service and can be used to trigger the multi-layer analysis, computation of new viable restoration paths, and multi-stage policy-based ranking of the new restoration paths for the service. The "Replace" threshold is used to trigger the off-box engine to push the computed and pre-ranked paths into the network, i.e., the on-box control plane 16 so that the new ranked new viable restoration paths are not on the associated source nodes for the at-risk services. In this way the on-box control plane 16 always has the optimal set of paths available to select from when performing restoration without the need to increase the on-box memory or CPU power, i.e., no need to increase the processing power to compute paths on-box.

Detailed aspects of the process 100 and the six components are expanded as follows.

Service Monitoring

For a given service (e.g., SNC), the process 100 includes monitoring the health of each restoration path for that service (e.g., DTLSET) for detecting changes in the optical network 10 that reduce the availability of restoration paths below an acceptable level. The process 100 then uses this information to derive the impact on the service constraints and service availability (including detection of loss of diversity, i.e., any restoration paths that share common risks that may lead to one issue eliminating many restoration paths). The process 100 can focus on all services as well as any subset of services, e.g., based on priority or user selected.

There are two main components to the service monitoring function: 1) Ability to restore a service, i.e., is there a viable path in the DTLSET; and 2) The quality of the service restoration, i.e., margin, bandwidth, etc. A user can track the ability to restore a service though: 1) a dashboard; and 2) a filterable and sortable per service view via a service list view. As described herein, example User Interface (UI) screenshots are illustrated and these relate to a software tool executed off-box for the process 100.

Figure 5:
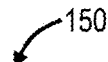
FIG. 5 is a screenshot of a dashboard illustrating a warning threshold used to alert the increased risk of a specific service failing due to a lack of restoration paths and a replace threshold used to determine when it should replace the failed routes for a service.

FIG. 5 is a screenshot of a dashboard 150 illustrating a warning threshold used to alert the increased risk of a specific service failing due to a lack of restoration paths and a replace threshold used to determine when it should replace the failed routes for a service. The "Failed" to refresh row tracks services that the solution has been unable to re-supply due to network conditions (e.g., loss of access (LOA) to the head-end node (source node)).

Figure 6:
FIG. 6 is a screenshot of a zoomed in view in the dashboard illustrating a service in a list view.
Figure 6:
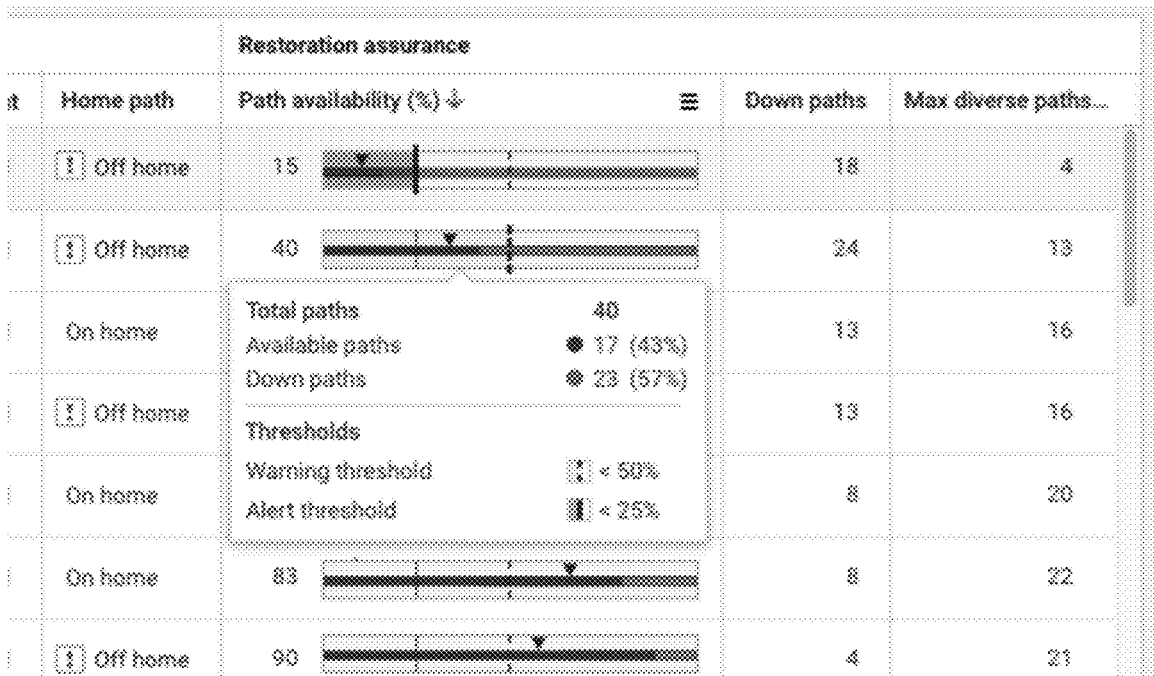

FIG. 6 is a screenshot of a zoomed in view 152 in the dashboard 150 illustrating a service in a list view. In the control plane 16, a given service (SNC) can be said to be on a home path ("on home") when it is active on its main provisioned path, i.e., the desired path when the service was provisioned. Conversely, a service is said to be off the home path ("off home") when it has been rerouted to one of the restoration paths. Of note, a given service can be off home for any number of reasons, e.g., faults, maintenance, pre-emption, etc.

The process 100 is configured to monitor the quality of the restoration paths by continuously running failure analysis and constraint violation recovery analysis on repaired links to detect non-optimal restoration DTLSETs that can now be updated with routes (DTLs) that comply to the service's policy. This step brings two main values:

(1) This is the opposite of the progressive constraint relaxation algorithm used when the number of routes in the network are too few. It brings a service's routes back into alignment with its policy.

(2) Detects repairs that have made the route non-viable for the service. This addresses bad repairs, too many repairs, and repairs that lengthen the route distance and thus impact some (longer) services.

The user can allow the process 100 to automatically adjust routes (DTLSETs) as repaired routes allow or manage this manually.

Computation of Viable Paths

Again, computed restoration paths are available in the control plane 16. The present disclosure introduces variable quality computed restoration paths. Key characteristics of computed paths include:

(1) All computed paths are viable. We use two different types of viability, instantaneous viability which is computed from network data and excludes repair and other EOL margin reservations and EOL viability which includes these factors.

(2) Paths can take advantage of the optical modems downshifting in capacity, i.e., to support lower capacity at longer reach when needed.

(3) Service restoration path constraints can be progressive relaxed according to policy to enable less desirable paths to be selected when necessary.

Algorithmically, the process 100 can compute and maintain an "emergency" restoration path as soon as the "Warning" threshold is crossed. This is done to ensure that the process 100 always has at least one viable and available path that can be pushed into the network for any failed SNC. Then a full DTLSET computation can occur.

Multi-Stage Policy-Based Ranking/Optimizing of Paths

In a larger network, key routes tend to become overloaded during network outages. The multi-stage ranking of paths attempts to intelligently use the available resources without resorting to pushing all services to use their worse acceptable paths first. The simple and obvious solution is to rank the least used or maximally diverse paths first. However, this also tends to result in the least desirable paths for that service to be used before more desirable paths.

The multi-stage policy-based ranking is used to ensure the routing engine in the process 100 selects the paths that are most preferred for as many services as possible given the state of the network. Key parts of this algorithm include:

(1) Services are processed by priority to ensure that higher services are routed before lower priority services.

(2) The process 100 will then compute all paths that satisfy the most relaxed set of constraints allowed by that service's policy, ordered from maximum number of constraints satisfied to least number of constraints satisfied.

(3) There is a check to ensure any provider restoration path policies have not been violated. For example, returning a path that circles the globe to get from New York to Boston is an example of a policy violation.

(4) When computing alternative restoration paths, the process 100 weights links with a higher reliability/up-time so that they are preferred over links with lower reliability/up-time.

(5) The process 100 includes a link over-subscription threshold as a restoration routing metric to ensure that balancing the traffic across the network (without compromising individual service policy).

(6) As the network contracts due to faults, key routes will have their over-subscription factor (number of services using that link in a path/DTLSET) increase.

Once all possible paths are known for the set of services that require refresh, paths are distributed to each service needing refresh such that an equitable allocation of preferred paths to each service is achieved. Post processing is applied to services where the process 100 could not find a full set of replacement paths. The process 100 will fill out these DTLSET with the highest-ranked faulted paths-network repair work will make faulted paths available again.

Emergency Repair Linkage

The process 100 is also able to "propose" non-service affecting and service affecting service moves that would free up critical resources to enable failed services to restore, namely:

(1) a first pass looks for services that are currently protected (sub-50 ms) either at same or higher layer and which switching to its protection path frees up critical infrastructure or capacity on the existing path.

(2) Then a second pass is made evaluating if lower priority restorable services (>50 ms switch times) could be moved to alternative paths (force a switch) to free up bandwidth for higher priority services.

(3) Finally, a third pass is made as described in the "Multi-layer Analysis" description that follow and contributes two key aspects:

(a) Evaluates if the lower layer restoration has a high impact (relies/avoid congestion) or a low impact (preserves existing throughput numbers/capacity) on the higher layer services.

(b) Identifies opportunities to provide more lower layer bandwidth for an existing higher layer path instead of simply restoring the existing failed lower layer path. As the network fractures due to outages, the higher layer may establish routes on more constrained paths. Temporarily enabling more capacity on these in use paths can avoid triggering additional switching at the higher layer.

In all cases lower priority services are selected before higher priority services. The proposed services are also evaluated based on current traffic utilization such that lightly utilization services are selected before highly utilized services. Once the network has stabilized, the customer will want to return to the original set of service paths. Thus, the process 100 can store any moves triggered above so that a controlled revert to these original paths can be accomplished by the user at a later time.

Fault Management Linkage

This same over-subscription factor can be used during alarm triage to automatically prioritize equipment and topology (links) whose repair will result in the most important services being repaired first. The same approach can be used to rank repairs to prioritize:

(1) Most important services first;
(2) Enable restoration of the greatest number of currently "Down" services;
(3) Enable off-box component to write new restoration paths for services with an insufficient number of restoration paths; etc.

The various UIs can include a fault management UI to display "high-risk" links. Links with a high number of restoration paths depending on this link. It can also identify links/routes/paths where one or more services are currently above their warning threshold and computation of path is occurring. This allows the user to graphically track the state of the Network and provides an intuitive way to see how congested the routes in the network are becoming.

Multi-Layer Analysis

The multi-layer analysis is performed by the process 100, off-box, to tie higher layers (e.g., L2, L3) to the optical layer (L0), e.g., to identify congestion problems between two end points (routers) in the higher layer network (L2/L3), rank these end points by traffic importance (priority) and size, utilization and Congestion risk, and then hunt for opportunities in the lower layer network (L0/L1) to temporarily relive the congestion by using unassigned equipment to establish new routes/capacity between the necessary end-points and then growing the higher layer capacity between the two end points (routers).

Additionally, the process 100 includes two enhancements to the above"

(1) The process 100 may re-use assigned equipment that is current unused (fallow) due to an existing network outage or may use Planned and Installed equipment that is scheduled to become used in the future but is currently unused. The process 100 can use a timer mechanism to minimize the chance of very short duration relief at the higher layers (due to using fallow equipment, only to have its lower layer route repaired minutes later).

(2) If unused spare equipment (modems) have been installed and fibered to a port, then these can be utilized in the same way as explained above. The advantage of this approach is that spare equipment is not part of an existing service, so it can be used for a longer duration.

The realization here is that repairing a failed L0 link, may not have the most impact at the higher layers in large networks with multiple active outages. Due to other failures in network (at any layer of the operator's network and across multiple vendors), it may be more advantages to turn-up a different A-Z path that re-uses only one of the transponders (A-end or Z-end) of a failed path.

Threshold Based DTLSET Path Refresh

This part of the process 100 is responsible for pushing the service's refreshed DTLSET as quickly as possible into the network, i.e., to the on-box control plane 16, specifically to the nodes 12 which are source or head-end nodes for given services. There are two unusual behaviors:

(1) If a service should simultaneously or in quick succession, cross both the "Warning" threshold and the "Replace" threshold (and may even transition to "Down") before a complete set of viable and ranks paths have been computed, the process 100 is able to push an emergency restoration path which is known to be viable and available to bring the service back up as quickly as possible. Then when the full set of restoration paths have been computed, the process 100 will push the new DTLSET bring the service back in-line with expectations (of always having a full DTLSET).

(2) As mentioned above in the service monitoring, DTL-SETs can also be refreshed because the quality of the DTLSET is low (service constraint violations exist, contains paths with a reduced capacity (i.e., downshifted), etc.). The process 100 monitors for these opportunities as well and will refresh a DTLSET to improve the quality of the restoration paths when it can (opportunistically).

Threshold Based DTLSET Reversion to Original Paths

The final step in the process 100 is to monitor each service's "original" DTLSET to determine when the on-going network repairs have resulted in a sufficient number of "original" DTLs to return to available such that it makes sense to return the service's DTLSET to its original DTLs. This last step is important as it prevents the situation where a service's restoration paths creep away from the most desirable/optimal paths in the network over time.

Related UX/UI Enhancements

Figure 7:
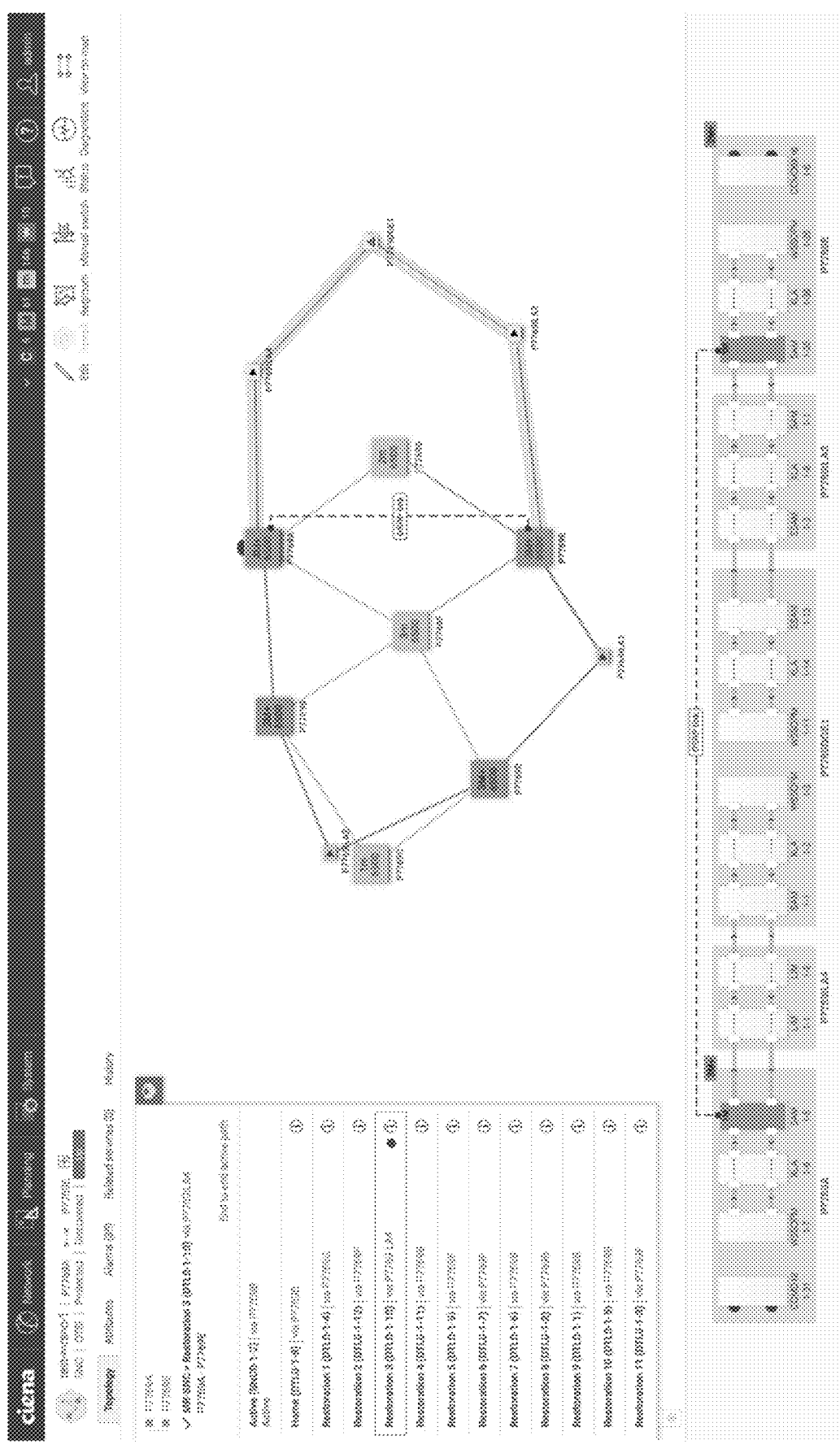
FIG. 7 is a screenshot of a UI illustrating the ability to differentiate between problems associated with implementing the process and problems in the network.

FIG. 7 is a screenshot of a UI illustrating the ability to differentiate between problems associated with implementing the process 100 and problems in the network. The process 100 splits the work between off-box and on-box components must distinguish between problems of the system, such as a loss of communication to a head-end node indicating that restoration path updates cannot currently be made, and problems of the network, such as a fiber has been cut and needs to be repaired.

The solution provides this differentiation on a per service basis as well as in the dashboard (FIG. 3) so that users can use this information to prioritize repairs. If a restorability issue cannot be addressed because of communication issues to the head-end node to send a refreshed DTLSET, that is emphasized to the user as it means that not only is there real risk to the service (as per last-known state of the network), but there is no automated fix available at this time. This may be considered when prioritizing repairs. This dove tails with the fault management linkage described above.

FIG. 8 is a screenshot of a UI illustrating a restoration assurance and diversity status health monitor. This adds a diversity status alerting the user using various statements in a popover.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A non-transitory computer-readable medium comprising instructions that, when executed, cause one or more processors to perform steps of:

continuously tracking health of services in an optical network, monitoring how many restoration paths remain accessible to an on-box control plane, and quality of any remaining restoration paths;

managing restoration paths installed on a plurality of nodes in the optical network to one or more of remove unavailable restoration paths and add new available restoration paths for any of the services in the optical network, including maintaining for each service a restoration path set installed on a head-end node of the plurality of nodes and dynamically updating the restoration path set to remove unavailable restoration paths and add newly computed restoration paths;

responsive to detecting one or more at-risk services, for the one or more at-risk services, performing computation of new viable restoration paths and a multi-stage policy-based ranking of the new restoration paths for the one or more at-risk services; and for the one or more at risk services, pushing the ranked new viable restoration paths to the on-box control plane based on thresholds, including refreshing the restoration path set installed at the head-end node so that an on-box restoration engine has validated restoration paths available before exhausting a current set of restoration paths for the service.

2. The non-transitory computer-readable medium of claim 1, wherein the on-box control plane is implemented via the plurality of nodes, and the services are managed by an associated head-end node of the plurality of nodes, wherein the associated head-end node includes a restoration path set comprising a plurality of restoration paths installed thereon for the service and selectable by the on-box control plane for restoration of the service.

3. The non-transitory computer-readable medium of claim 1, wherein the steps are performed by an off-box processing system communicatively coupled to the optical network and the on-box control plane.

4. The non-transitory computer-readable medium of claim 1, wherein the new viable restoration paths are determined first using End-of-Life (EOL) viability, second using instantaneous viability, and finally using downshifted capacity.

5. The non-transitory computer-readable medium of claim 1, wherein the steps further include for an at-risk service of the one or more at-risk services, responsive to detecting a number of corresponding restoration paths is below a threshold, determining an emergency restoration path for the at-risk service and pushing the emergency restoration path to a corresponding head-end node for the at-risk service.

6. The non-transitory computer-readable medium of claim 1, wherein the multi-stage policy-based ranking includes processing the services based on priority, relaxing constraints on the processing for lower priority services, and determining the new restoration paths considering up-time of links and over-subscription of the links.

7. The non-transitory computer-readable medium of claim 1, wherein the computation of the new viable restoration paths includes considering for use any equipment in the optical network that is available due to one of faults and installed for future use.

8. The non-transitory computer-readable medium of claim 1, wherein the steps further include subsequent to the pushing the ranked new viable restoration paths for a service of the one or more at-risk services, monitoring the optical network for any opportunity to return to the restoration paths for the service prior to the pushing.

9. The non-transitory computer-readable medium of claim 1, wherein the steps further include displaying a user interface visualizing the one or more at-risk services including any of the at-risk services due to lack of communication to the on-box control plane.

10. A method comprising steps of:

continuously tracking health of services in an optical network, monitoring how many restoration paths remain accessible to an on-box control plane, and quality of any remaining restoration paths;

managing restoration paths installed on a plurality of nodes in the optical network to one or more of remove unavailable restoration paths and add new available restoration paths for any of the services in the optical network, including maintaining for each service a restoration path set installed on a head-end node of the plurality of nodes and dynamically updating the restoration path set to remove unavailable restoration paths and add newly computed restoration paths;

responsive to detecting one or more at-risk services, for the one or more at-risk services, performing computation of new viable restoration paths and a multi-stage policy-based ranking of the new restoration paths for the one or more at-risk services; and for the one or more at risk services, pushing the ranked new viable restoration paths to the on-box control plane based on thresholds, including refreshing the restoration path set installed at the head-end node so that an on-box restoration engine has validated restoration paths available before exhausting a current set of restoration paths for the service.

11. The method of claim 10, wherein the on-box control plane is implemented via the plurality of nodes, and the services are managed by an associated head-end node of the plurality of nodes, wherein the associated head-end node includes a restoration path set comprising a plurality of restoration paths installed thereon for the service and selectable by the on-box control plane for restoration of the service.

12. The method of claim 10, wherein the steps are performed by an off-box processing system communicatively coupled to the optical network and the on-box control plane.

13. The method of claim 10, wherein the new viable restoration paths are determined first using End-of-Life (EOL) viability, second using instantaneous viability, and finally using downshifted capacity.

14. The method of claim 10, wherein the steps further include for an at-risk service of the one or more at-risk services, responsive to detecting a number of corresponding restoration paths is below a threshold, determining an emergency restoration path for the at-risk service and pushing the emergency restoration path to a corresponding head-end node for the at-risk service.

15. The method of claim 10, wherein the multi-stage policy-based ranking includes processing the services based on priority, relaxing constraints on the processing for lower priority services, and determining the new restoration paths considering up-time of links and over-subscription of the links.

16. The method of claim 10, wherein the computation of the new viable restoration paths includes considering for use any equipment in the optical network that is available due to one of faults and installed for future use.

17. The method of claim 10, wherein the steps further include subsequent to the pushing the ranked new viable restoration paths for a service of the one or more at-risk services, monitoring the optical network for any opportunity to return to the restoration paths for the service prior to the pushing.

18. An apparatus comprising:

one or more processors, a network interface communicatively coupled to an on-box control plane associated with an optical network, and memory storing instructions that, when executed, cause the one or more processors to continuously track health of services in the optical network, monitoring how many restoration paths remain accessible to an on-box control plane, and quality of any remaining restoration paths;

managing restoration paths installed on a plurality of nodes in the optical network to one or more of remove unavailable restoration paths and add new available restoration paths for any of the services in the optical network, including maintaining for each service a restoration path set installed on a head-end node of the plurality of nodes and dynamically updating the restoration path set to remove unavailable restoration paths and add newly computed restoration paths;

responsive to detecting one or more at-risk services, for the one or more at-risk services, performing computation of new viable restoration paths and a multi-stage policy-based ranking of the new restoration paths for the one or more at-risk services; and for the one or more at risk services, pushing the ranked new viable restoration paths to the on-box control plane based on thresholds, including refreshing the restoration path set installed at the head-end node so that an on-box restoration engine has validated restoration paths available before exhausting a current set of restoration paths for the service.

19. The apparatus of claim 18, wherein the on-box control plane is implemented via the plurality of nodes, and the services are managed by an associated head-end node of the plurality of nodes, wherein the associated head-end node includes a restoration path set comprising a plurality of restoration paths installed thereon for the service and selectable by the on-box control plane for restoration of the service.

20. The apparatus of claim 18, wherein the new viable restoration paths are determined first using End-of-Life (EOL) viability, second using instantaneous viability, and finally using downshifted capacity.

\* \* \* \* \*